United States Patent Office 2,720,275
Patented Oct. 11, 1955

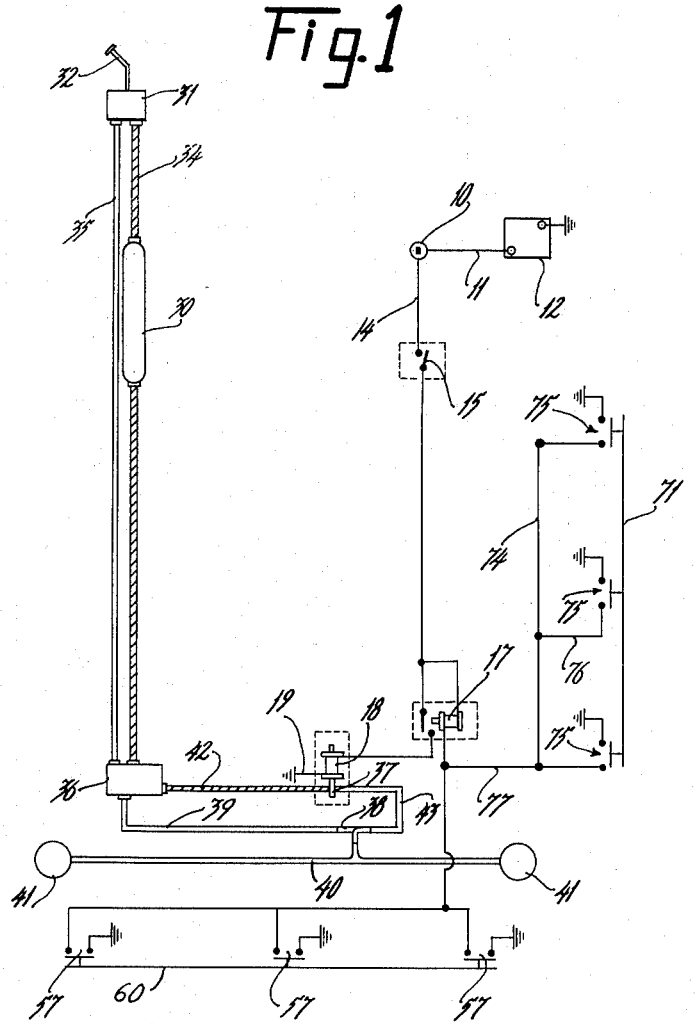
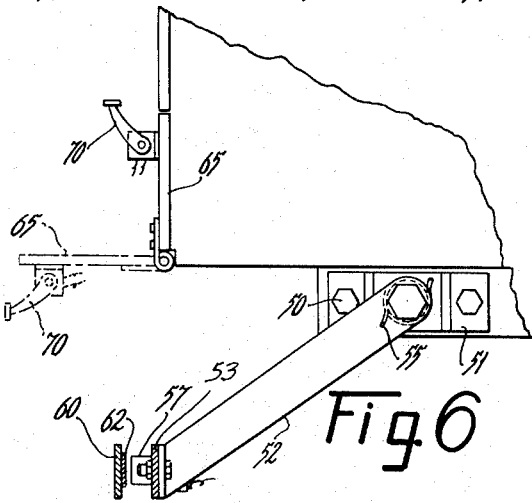
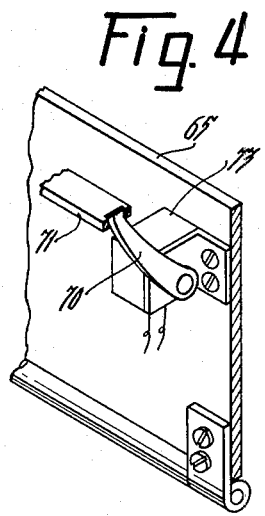
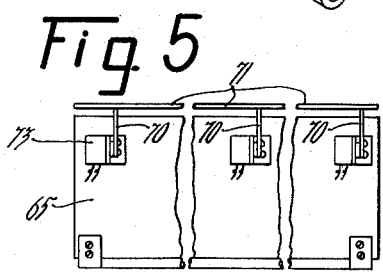
INVENTOR.
HOWARD S. THAYER

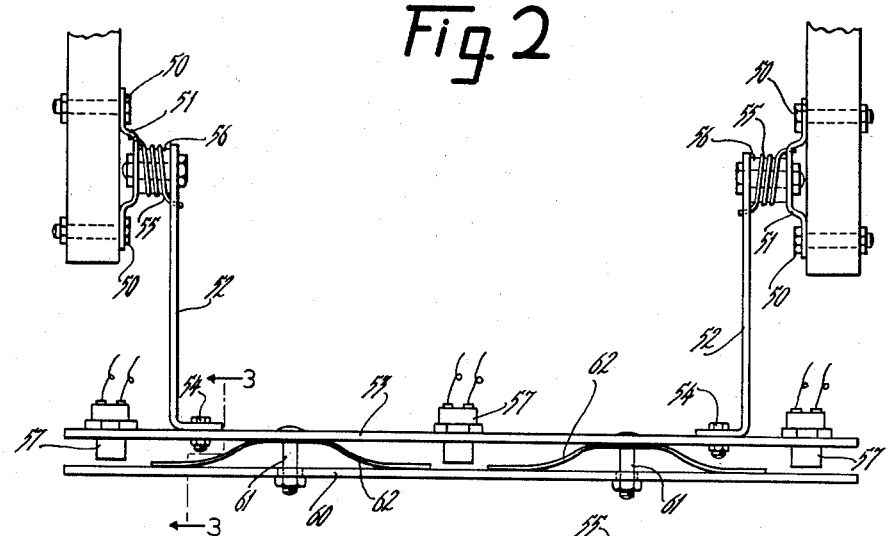
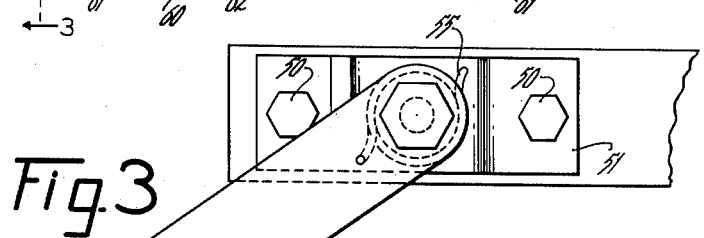
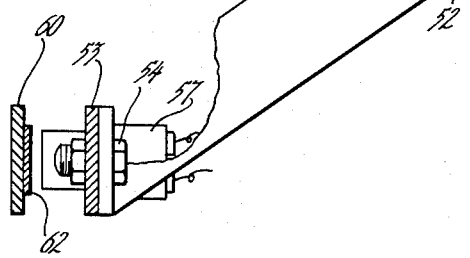
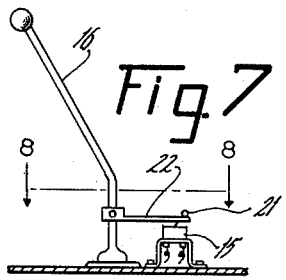
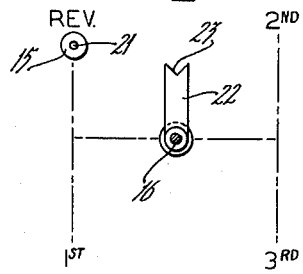
INVENTOR.
HOWARD S. THAYER

2,720,275
BRAKE CONTROL SYSTEM OPERATIVE DURING REARWARD MOVEMENT OF VEHICLE

Howard S. Thayer, Columbia, Conn.

Application November 14, 1952, Serial No. 320,590

1 Claim. (Cl. 180—83)

This invention relates to safety devices for motor vehicles and more particularly to automatic braking devices for trucks, tractor-trailer units and buses, adapted to function in their slow backing operations when difficulty exists in obtaining view of obstacles which are in the path to be taken by the vehicle.

The invention has for one of its objects to provide a simple and inexpensive means for quickly and automatically applying brakes to the wheels of the vehicle in backing operation as a consequence of an obstacle being contacted, while at the same time providing for normal braking operations in either forward or backward movement.

Another object is in the provision of safety means which permit normal forward movement of the vehicle when it is proceeding in that direction or is at rest, and is struck from the rear, thus offering less resistance and minimizing damage.

Still another object resides in the particular application of the safety feature to trucks and to trucks having drop tail-boards which protrude some distance to the rear when in down, horizontal position.

Other objects will be in part obvious and in part pointed out particularly as the following description of the invention proceeds.

The invention accordingly consists in the various combinations of elements, arrangements of parts and association of features which will be exemplified by the following description of a preferred form of the invention, and the scope of the application of which will be indicated in the appended claim.

In the accompanying drawings, wherein is shown one of various possible embodiments of the invention:

Fig. 1 is a diagrammatic view of a conventional air braking system of a motor truck modified to incorporate the present invention.

Fig. 2 is a plan view of the rear of the truck chassis showing modifications incorporating features of the invention.

Fig. 3 is a sectional view of the assembly shown in Fig. 2 taken on the line 3—3 of Fig. 2, and enlarged somewhat for better understanding.

Fig. 4 is a view in fragmentary perspective of a conventional tail-board of a truck as modified to incorporate features of the invention.

Fig. 5 is a view in rear elevation of the modified tail-board shown in Fig. 4.

Fig. 6 is a view in right side elevation, and partly in section, of the rear of the truck, showing the modified tail-board in dot-and-dash lines in its horizontal position.

Fig. 7 is a view in side elevation of a conventional gear shift lever modified to incorporate features of the invention.

Fig. 8 is a diagram taken in the plane 8—8 of Fig. 7 and representative of different shift positions of the shift lever and indicating the action of closing a switch in shifting to reverse.

Referring now more in detail to the drawings, the conventional ignition switch of the truck is indicated at 10 with connector 11 from one side to battery 12 which is grounded as indicated in Fig. 1. Return connections to the other side of the switch, for starting and ignition purposes, are not shown as they are conventional and not pertinent to the present invention. However, the closing of switch 10 by the usual ignition key or other means connects a lead 14 into the battery or generator circuit, as the case may be, so that when a switch 15 is closed by the gear-shift-lever 16 as it is moved into reverse position (see Figs. 7 and 8) the coil of electromagnet 17 is included in the line. The armature of magnet 17 when moved by the energization of the coil includes a solenoid 18 in the line through lead 19 to ground.

Magnet 17 and solenoid 18 remain normally unenergized despite the closing of ignition switch 10 and switch 15, providing for normal operation of the vehicle both in forward direction at any of the forward speed drives and in rearward direction even with the switch 15 closed as by moving the gear-shift-lever 16 to operate the spring-returned switch-lever 21 by an arm 22 fixed to the gear-shift-lever and provided with a V-shaped guide 23 at its outer end.

The present invention is supplemental to a well-known pneumatic wheel-braking system indicated diagrammatically in Fig. 1, comprising a compressed air reservoir 30, controlled by a valve 31 which in turn is controlled by foot pedal 32. Opening of valve 31 by its control releases compressed air through air line 34 to air line 35, to a relay valve 36, to air line 39, through a check valve 38 to air line 40, to brake chambers 41.

According to modifications brought about by the present invention, an air line 42 is extended from relay valve 36 to a valve 37, governed by the solenoid 18, and normally closed to prevent the passage of air beyond the line 42. When the solenoid is energized the valve 37 opens to permit the compressed air to pass through an air line 43, through check valve 38 to air line 40 to brake chambers 41.

At the rear of the vehicle and held to the chassis or other suitable part by bolts 50 and plates 51 are two rearwardly and downwardly extending arms 52 to which is secured a bar 53 by bolts 54. These arms are yieldingly held in a normal diagonal position as shown in Fig. 3, by coiled springs 55 around a fastening shank 56, one end of the spring bearing on the arm and the other secured in the plate 51. The bar 53 is provided with a number of push button switches 57 which are adapted to be closed when an outer rail 60 is pressed against them as by the rail encountering any object in the backing of the vehicle. The rail 60 is loosely mounted on the bar 53 by pins 61 and spring-held separated therefrom, and from the buttons 58, by leaf springs 62.

Referring to the diagram Fig. 1 of the drawings, it will be seen that closure of any one or more of the push button switches 57, which are grounded, will complete the circuit through magnet 17 which in turn completes the circuit to solenoid 18, opening valve 37 and supplying an instant braking pressure of compressed air to the braking chambers as set forth above.

A problem arises in connection with trucks having tail-boards, for which type of truck this invention has special fitness, because of the frequent backing of such trucks for unloading and loading purposes. The tail-board when lowered usually extends well beyond the rear of the truck body and it is undesirable to have the rail of the safety device extend greatly to the rear. To meet this problem two or three arms 70 are yieldingly mounted at the top rear of the tail-board 65 in somewhat the same manner as the arms 52. A rail 71 is fixed on these arms in position to extend beyond the rear edge of the tail-board when it is in lowered horizontal position. In this case, however, the electric switches are in the spring mounting casings 73 and movement of the arms 70, under circuit conditions such as previously described with respect to arms 52, to make electric switch contact as at 75 (see Fig. 1), establishes a circuit through leads 74, 76 and 77 to magnet 17 and thus in such case energizes solenoid 18 to open the valve 37 and release compressed air from supply 30 to the chambers 41.

What is claimed is:

In a vehicle having fluid actuated brakes, a gear shift lever, a source of electric potential and an ignition switch; a safety mechanism comprising a first electric circuit having said ignition switch and source of potential therein, a normally open solenoid actuated first switch having the solenoid thereof in said circuit, a normally open second switch in the circuit between the ignition switch and said first switch, means actuated by the gear shift lever for effecting closing of said second switch upon positioning the gear shift lever in "reverse" gear position, a normally open third switch in said circuit, means supporting said third switch in operative position on the vehicle, an impact member movably carried by the supporting means for effecting when struck and moved in one direction the closing of the third switch, a second circuit in parallel to and connected with that part of the first circuit having the solenoid and third switch therein, said first switch being in the second circuit, and a normally closed solenoid operated valve in the second circuit, said valve functioning when opened to effect actuation of said brakes.

References Cited in the file of this patent

UNITED STATES PATENTS

| | | |
|---|---|---|
| 2,185,936 | Yamada | Jan. 2, 1940 |
| 2,228,631 | Kuiper | Jan. 14, 1941 |
| 2,588,815 | Fasolino | Mar. 11, 1952 |